(No Model.)

E. E. TOWNS.
CORN SHELLER.

No. 265,995. Patented Oct. 17, 1882.

WITNESSES
F. L. Durand.
N. L. Collamer.

INVENTOR
Elijah E. Towns,
by C. A. Snow & Co,
Attorneys.

UNITED STATES PATENT OFFICE.

ELIJAH E. TOWNS, OF TOWNS, GEORGIA.

CORN-SHELLER.

SPECIFICATION forming part of Letters Patent No. 265,995, dated October 17, 1882.

Application filed August 16, 1882. (No model.)

*To all whom it may concern:*

Be it known that I, ELIJAH E. TOWNS, of Towns, in the county of Telfair and State of Georgia, have invented certain new and useful Improvements in Corn-Shellers; and I do hereby declare that the following is a full, clear, and exact description of the invention, which will enable others skilled in the art to which it appertains to make and use the same, reference being had to the accompanying drawings, which form a part of this specification.

This invention relates to hand corn-shellers, and has for its object to provide a simple, durable, inexpensive, and efficient device.

Figure 1:
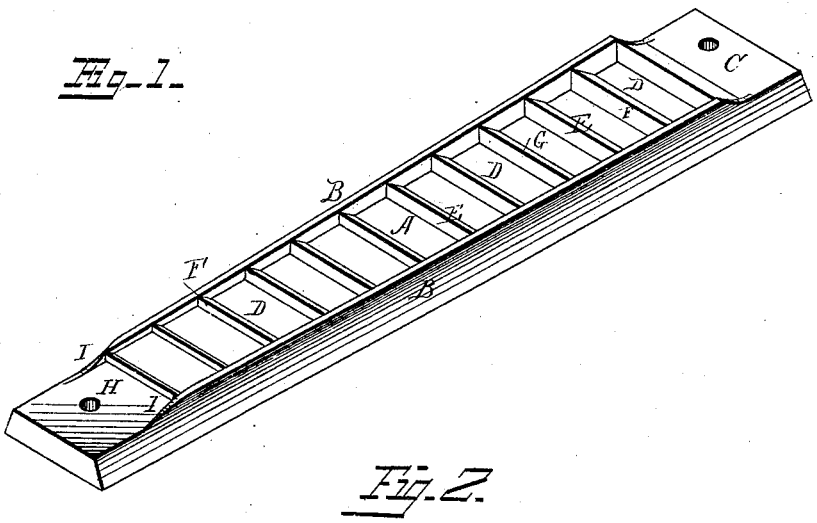
Figure 2:
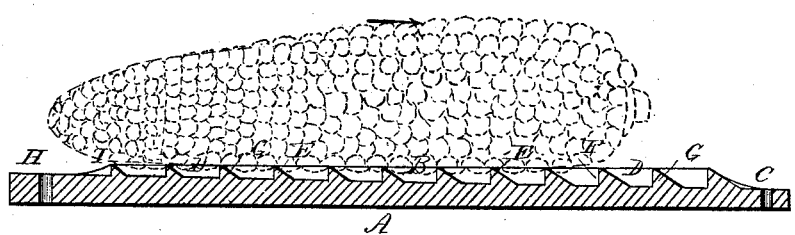
Figure 3:
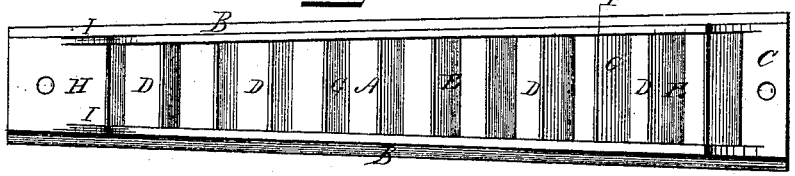

In the drawings, Figure 1 is a perspective view of my improved corn-sheller; Fig. 2, a longitudinal sectional view, and Fig. 3 a top view.

Referring to the drawings, A designates the body of the sheller, the whole device being preferably formed of cast-iron, and B B are longitudinal upright side flanges. The body A gradually enlarges toward its end C, and is provided with transverse parallel recesses or depressions D, the series gradually increasing in depth toward the larger end, C. Depressions D are formed and divided by transverse ridges E, having an abrupt front wall, F, and inclined rear wall, G. The front walls of the ridges gradually deepen toward the larger end, C— that is to say, the front wall of each successive ridge is deeper than that of the other, the increase being toward the end C. Each ridge E is of equal height with flanges B B, and the latter are curved or beveled off at the smaller end, H, as at I I.

The operation and advantages of my invention will be readily understood. The ear of corn is drawn against abrupt walls F, which rasp the grains off, and they fall into a suitable receptacle. The ear of corn is placed with its large or butt end toward the large end of the sheller, as shown in dotted lines, Fig. 2, and thus the increasing width of the body adapts it to the shape of the ear, and the varying size of the ridges is suited to the varying size of the grains. As the latter increase toward the larger end of the ear, the ridges increase toward the larger end of the body. The beveled sides of the ridges obviate clogging of the grains in the recesses, and the bevel of the side flanges at the smaller end enables a good start to be made with the ear of corn.

I claim as new—

1. A corn-sheller having a body, A, with longitudinal upright side flanges, B B, and transverse ridges E, of a height equal to the flanges, the ridges formed with a front wall, F, which gradually increases in height, and a beveled or curved rear wall, G, as set forth.

2. A corn-sheller having a body gradually increasing in width and provided with transverse ridges, each having an abrupt front wall and inclined rear wall, the series of abrupt walls gradually increasing in depth toward the larger end of the body, whereby the increasing width of the body adapts it to the shape of the ear and the varying size of the ridges is suited to the varying size of the grains as arranged on the ear, as set forth.

3. A corn-sheller having a body, A, with longitudinal upright side flanges, B B, said body gradually increasing in width and provided with transverse recesses or depressions D, gradually increasing in depth, and formed by transverse ridges E, each having an abrupt front wall, F, and inclined rear wall, G, and of a height equal to that of the flanges, the series of abrupt walls F gradually increasing in depth toward the larger end of the body, as set forth.

In testimony that I claim the foregoing as my own I have hereto affixed my signature in presence of two witnesses.

ELIJAH E. TOWNS.

Witnesses:
S. HARRIS,
H. PARIS.